Patented Sept. 27, 1949

2,483,347

UNITED STATES PATENT OFFICE 2,483,347

INTERMEDIATE PRODUCTS IN THE PRODUCTION OF DIALKYLAMINO VITAMIN A'S

Nicholas A. Milas, Belmont, Mass., assignor to Research Corporation, New York, N. Y., a corporation of New York No Drawing. Application November 14, 1946, Serial No. 709,784

2 Claims. (Cl. 260—584)

This is a continuation-in-part of my application Serial No. 540,002 filed June 12, 1944, now Patent No. 2,415,834. Said application describes a method for the production of dimethylamino vitamin A which, starting with a compound of the formula

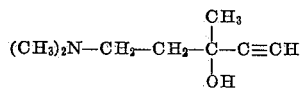

Compound X consists in dehydrating or dehydrohalogenating said compound to produce a compound of the formula

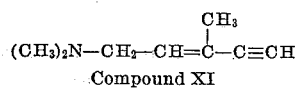

Compound XI preparing the Grignard or alkali metal derivative of Compound XI having the formula

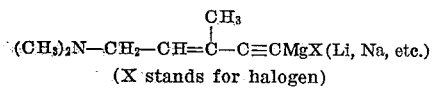

(X stands for halogen)

reacting the latter compound with a compound of the formula

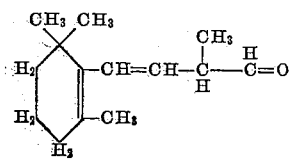

Compound IV or

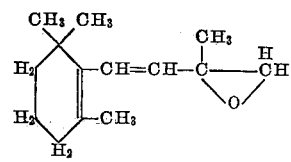

Compound IVa to produce a compound of the formula

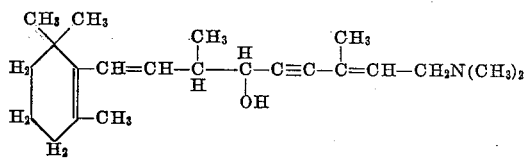

Compound XII or

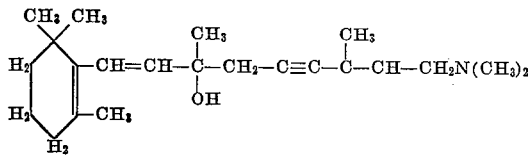

Compound XIIa partially hydrogenating said Compounds XII and XIIa to convert the acetylene bond thereof to an ethylene bond and dehydrating or dehydrohalogenating the resulting compounds to produce the compound of the formula

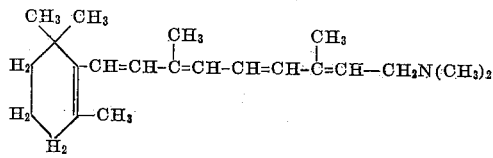

Compound I dimethylamino vitamin A.

In the foregoing general description and formulae and in the following specific examples the dimethylamino compounds are given for the purpose of illustrating the invention, it being understood that the methyl groups of the dimethylamino group in each instance may be replaced by any other monovalent hydrocarbon group such as any monovalent alkyl or aryl or aralkyl group. Thus the process of the present application may start with any compound of the formula

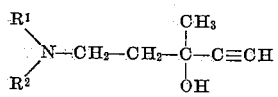

in which $R^1$ and $R^2$ stand for any monovalent hydrocarbon group and end with a corresponding compound of the formula

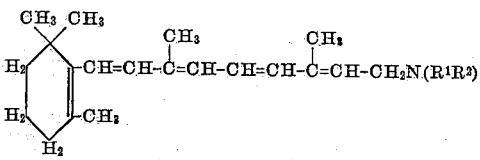

in which $R^1$ and $R^2$ stand for any monovalent hydrocarbon group.

The preparation of Compounds IV and IVa referred to above is described in my Patent No. 2,369,160.

Compound X may be prepared by interaction of sodium acetylide in liquid ammonia with dimethylamino-1 butanone-3 as follows:

*Synthesis of β-dimethylaminoethyl - ethynyl carbinol (Compound X)*.—Into 1500–1600 cc. of liquid ammonia, in a 3-l., three-necked flask equipped with an efficient stirrer and surrounded by an acetone-carbon dioxide freezing mixture, a rapid stream of dry acetylene is passed for about five minutes. While acetylene is still being passed, 23 g. (1 atom) of sodium is slowly added in the course of one hour taking care that the blue color formed with each addition is completely decolorized before more sodium is added. The temperature of the bath should be maintained at —50° to —40°. The temperature of the bath is then lowered to —70° and acetylene is allowed to pass through the mixture for an additional one hour. To this mixture is then slowly added with vigorous stirring 115 g. (1 mole) of dimethylamino-1 butanone-3, Compound VII, during a period of two and one-half hours. The mixture is stirred at about —70° for eight hours longer, then the ammonia is allowed to evaporate while acetylene is being passed through the mixture. The light brown syrupy residue is cooled to 0° and 600 cc. of ether added followed by 600 cc. of aqueous potassium bisulfate solution containing 136 g. (1 mole) of potassium bisulfate. The ethereal layer is separated, and the aqueous layer salted out and again extracted three times with 300 cc. of ether. The ether extracts are combined and dried over anhydrous magnesium sulfate; the mixture filtered and the ether removed under reduced pressure. The solid crystalline residue is further purified by dissolving it in 150 cc. pure petroleum ether and the solution cooled to —10°. A yield of 55 g. (39%) of the pure crystalline product M. P. 37–38° is obtained. The solid is unstable at room temperature and should be kept at 0° or below.

Anal. Calcd. for $C_8H_{15}ON$: N, 9.9 $\models$, 1.

Found: N, 10.3, 10.6; $\models$, 1.08.

The acetylene carbinol, Compound X, yields a white silver salt with ammoniacal silver nitrate and forms a stable crystalline hydrochloride M. P. 149–151°.

An alternative procedure for the synthesis of Compound X is as follows:

To 400 cc. of anhydrous t-butyl alcohol (distilled over a small amount of metallic sodium) in a 3 liter, 3-necked flask equipped with a Hershberg stirrer, a dropping funnel and a bent side tube, add 20 g. of metallic potassium. After all of the potassium has dissolved, cool the mixture to room temperature and, while stirring, pass through it dry acetylene for one hour. Add slowly, in the course of two hours, while a rapid stream of acetylene is being passed through the solution, 57.5 g. of dimethylamino-1 butanone-3 (Compound VII) dissolved in about 200 cc. of anhydrous ether or some other low-boiling inert solvent. Continue stirring and passing acetylene for six hours longer. Pour the product slowly into 500 cc. of ammonium chloride solution containing 43 g. of ammonium chloride. Extract the mixture several times with ether and dry the combined extracts over anhydrous magnesium sulfate, then over anhydrous barium oxide, filter and remove ether under reduced pressure in an atmosphere of nitrogen. Recrystallize the residue from petroleum ether.

A third procedure for the synthesis of Compound X consists in allowing a steady current of dry acetylene to pass through a well cooled (—20°) suspension of about 20 g. of finely powdered sodamide (or lithiumamide) in 500 cc. anhydrous ether to saturate the latter, then adding dropwise 57.5 g. of dimethylamino-1 butanone-3 (Compound VII) in the course of three hours, keeping the mixture well stirred. Continue passing acetylene through the mixture for eight hours longer, then pour mixture on ice and ammonium chloride mixture and extract twice with ether. Dry ethereal solution with anhydrous magnesium sulfate, then with anhydrous barium oxide. Evaporate ether in an atmosphere of $N_2$ and recrystallize the residue from petroleum ether.

The dimethylamino-1 butanone-3 used in the foregoing example may be prepared as follows:

*Dimethylamino-1 butanone-3 (Compound VII).*—This ketone was prepared according to the method of Mannich (Mannich, Arch. Pharm. 255, 261 (1917)). A mixture of 81.5 g. dimethylamine hydrochloride, 85 g. of 37% formaldehyde, 300 g. of acetone and 160 cc. of water is heated under reflux for twelve hours. The mixture is then concentrated by distilling the excess acetone and water and the syrupy residue dissolved in the least volume of water. To this solution is then added a concentrated solution of potassium carbonate and the potassium chloride precipitated removed by filtration. When the filtrate is warmed on the water bath, the amine carbonate is decomposed and the keto-amine separated as an oil. Instead of using potassium carbonate, one may use concentrated potassium hydroxide to decompose the keto-amine hydrochloride, provided the reaction is accomplished at temperatures below zero. The keto-base is then dried over solid potassium hydroxide, fractionated under reduced pressure and the fraction boiling at 50–52° (13 mm.) collected as the keto-base. Yield, 34%.

The base forms a peculiarly smelling oil when warmed with water; forms a highly hygroscopic hydrochloride and a water soluble platinum double salt. A gold salt prepared from gold chloride and recrystallized from alcohol was found to melt at 124°–126°.

Compound X may be dehydrated or dehydrohalogenated to the production of Compound XI by well known procedure, for instance by the methods described in my Patent No. 2,369,160.

The Grignard or alkali metal derivatives of Compound XI also may be prepared by well known procedures, for instance as disclosed in my Patent No. 2,369,160 and the Grignard or sodium or lithium derivative of Compound XI may be reacted with Compounds IV or IVa by known procedure, for instance as disclosed in my Patent No. 2,369,160 and the resulting Compounds XII and XIIa hydrogenated and then dehydrated or dehydrohalogenated by known procedure, for instance as disclosed in my Patent No. 2,369,160.

I claim:

1. As a new product a compound of the formula

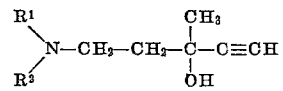

in which $R^1$ and $R^2$ each stands for a member of the group consisting of monovalent alkyl, aryl and aralkyl groups.

2. As a new product a compound of the formula

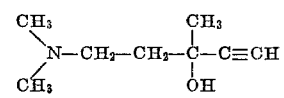

NICHOLAS A. MILAS.

No references cited.